April 8, 1969
F. A. NORMAN
3,437,290
VERTICAL LIFT AIRCRAFT
Filed April 24, 1967
Sheet 1 of 2
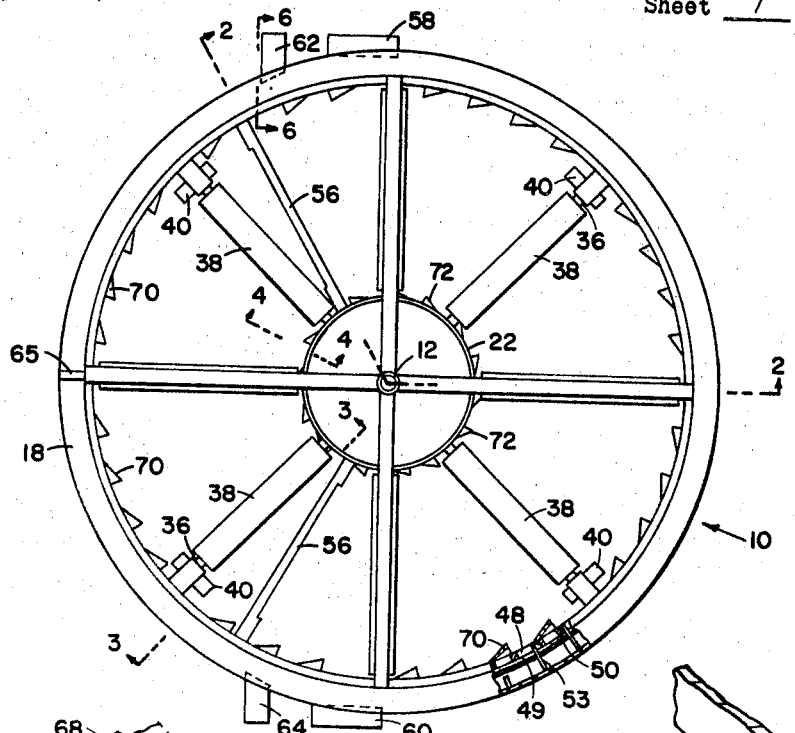
FIG. 1
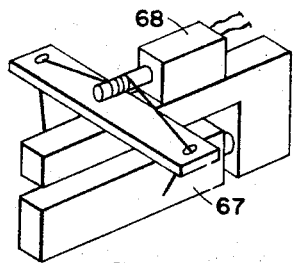
FIG. 8
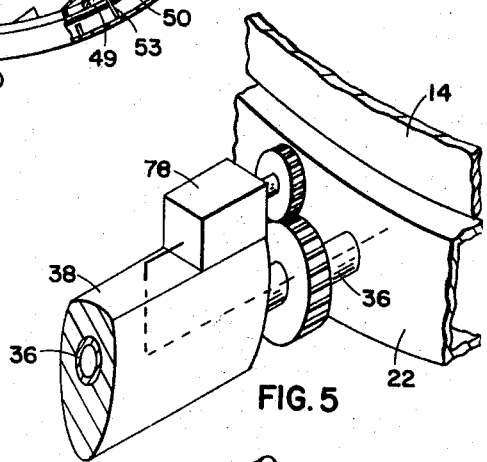
FIG. 5
FIG. 6
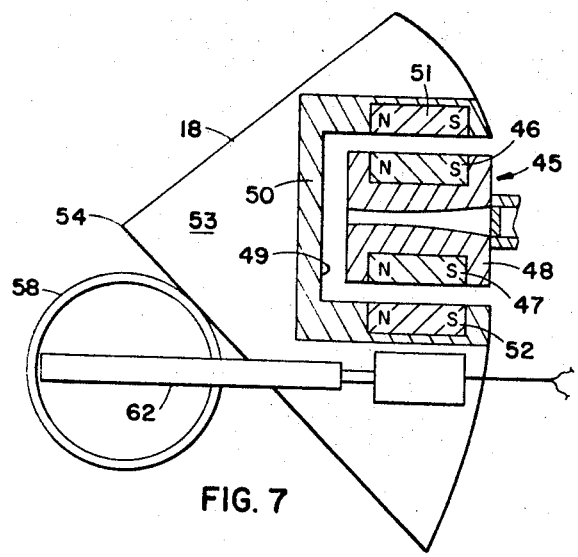
FIG. 7
Francis A. Norman,
INVENTOR.
BY
*Charles A. Phillips*
ATTORNEY.

April 8, 1969  F. A. NORMAN  3,437,290
VERTICAL LIFT AIRCRAFT
Filed April 24, 1967
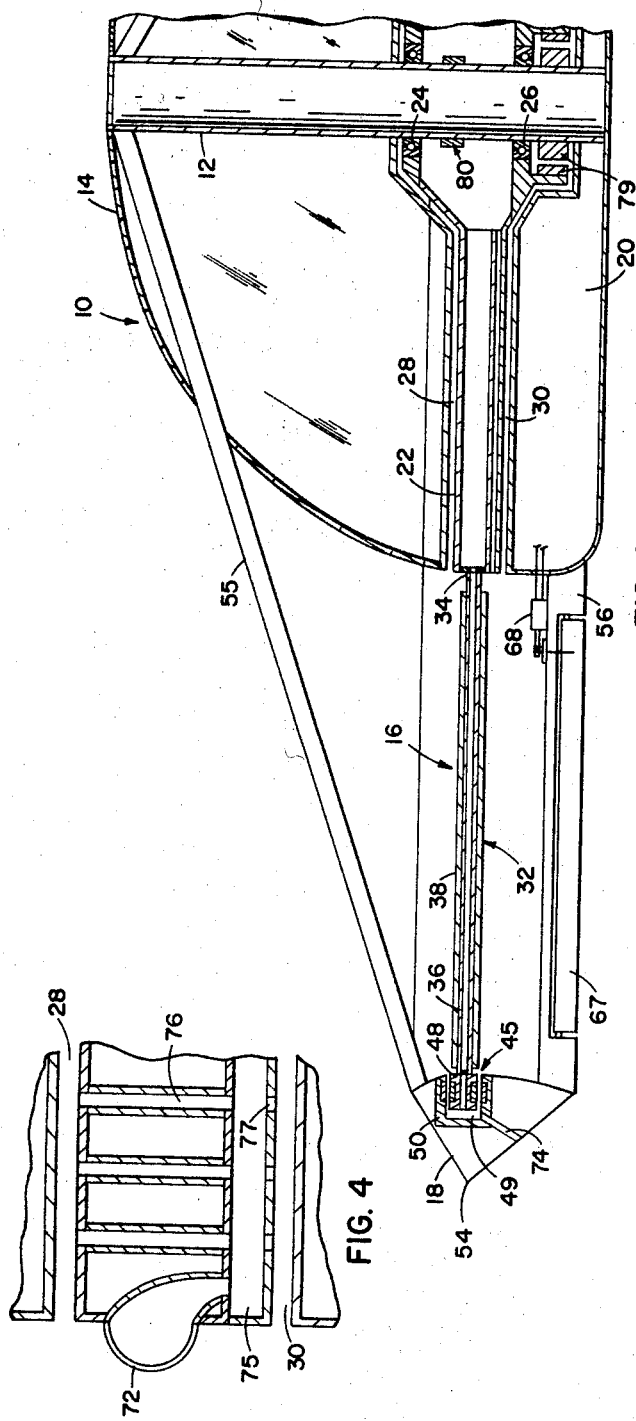
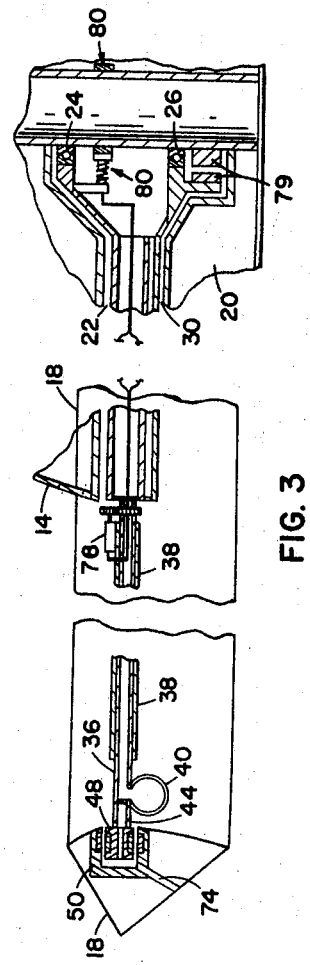
Francis A. Norman,
INVENTOR.
BY
*Charles Q. Phillips*
ATTORNEY.

United States Patent Office 3,437,290
Patented Apr. 8, 1969

3,437,290
VERTICAL LIFT AIRCRAFT
Francis A. Norman, 3003 Clubview Drive,
Columbus, Ga. 31906
Filed Apr. 24, 1967, Ser. No. 633,171
Int. Cl. B24c 29/04, 11/00
U.S. Cl. 244—23                                   9 Claims

ABSTRACT OF THE DISCLOSURE

A vertical lift aircraft employing a ducted fan powered by reaction motors, the motors being located near the periphery of the fan blades and the periphery of the fan blades being supported by a supporting and stabilization ring which is supported by an air and magnetic bearings, in turn supported by an outer fuselage, and which is in turn supported by a central support about which there is loacted a passenger cabin fuselage, the fan blades thus being positioned to rotate about the cabin fuselage in a duct between it and the outer fuselage.

---

This invention relates to a vertical lift aircraft and particularly to such aircraft employing a new and improved ducted fan lift system.

An object of this invention is to provide a novel and highly efficient lift system in an aircraft embodying the known advantages of the ducted fan concept and wherein the system is essentially free of friction and yet the aircraft is simple and uncomplex both as to manufacture and operation.

A further object is to utilize the high speed efficiency characteristics of reaction type engines, such as the Athoyd or ram-jet, or turbo-jet, in a novel manner to translate their known high efficiencies at high air speeds in general to a high efficiency lifting force for use in an aircraft capable of both hovering and high forward speeds.

A further object is to provide an aircraft of great maneuverability and stability.

A further object is to provide annular central and circumferential bearings of great capacity and minimum friction to guide and confine a highly loaded lift fan rotor in a fixed plane relative to said aircraft.

A further object is to provide power or energy for vertical lift additional to that available at any given moment from the basic lift producing propulsion units alone.

A further object is to permit precise maneuvers in any horizontal and/or vertical direction when hovering, so as to permit safe operation at minimum altitude in confined areas.

A still further object is to provide a simplified lifting system embodying the above characteristics which is readily adaptable to aircraft of various sizes and configurations.

In accordance with the invention a ducted fan type vertical lift aircraft is constructed with a central fuselage and an outer ring-shaped fuselage between which would be an annular duct in which a fan assembly would rotate. The central fuselage houses a passenger and control cabin and the outer fuselage is supported by struts from the central fuselage. The outer fuselage provides a substantial bearing support for a ring or wheel which surrounds and provides end support for the fan blades of the fan assembly. With this support, which is in addition to support for the fan assembly from its central point of rotation about a vertical shaft extending vertically at the center of the passenger and control cabin, means are provided to permit the blades to be rotated at very high speeds without danger of their being thrown outward by the high centrifugal forces developed at high speeds. This in turn permits the efficient usage of reaction motors, including ram-jets, which is one feature of the invention are positioned near the periphery of the blade assembly.

As a further feature and advantage of the ring support for the blades, this ring support, by virtue of its rotation, provides gyroscopic stabilization and kinetic energy which can be called on to augment the power otherwise available for lift and this is particularly of value in instances of brief requirements for additional power as for example where there is a temporary loss or reduction of power from the prime power source.

As still an additional feature of the invention a fuel or fuel tanks are included in the rotating blade assembly and fuel is fed directly from the tank or tanks, which are positioned near the axis of the vertical shaft support, out through hollow tubular members which mount individual fans, to the reaction motors. The reaction motors are thus supplied through conventional pressure regulating means by virtue of the centrifugal force created by the rotation of the fan blade assembly.

As still another feature of the invention essentially frictionless support is provided for the support between the periphery of the ring confining the fan and the outer fuselage by providing a self-pumping air bearing system, a magnetic bearing or a combination of both. Similarly, support for the fan assembly with respect to the central cabin is provided or assisted by a second self-pumping or self-generating air bearing system.

These and other objects, features and advantages of the invention will become more apparent from the following description when considered together with the drawings in which:

FIG. 1 is a plan view of an embodiment of the invention less control systems;

FIG. 2 is a partial section view along the lines 2—2 of FIG. 1 drawn to different proportions for purposes of illustration;

FIG. 3 is a partial section view along the lines 3—3 of FIG. 1;

FIG. 4 is a partial section view along the lines 4—4 of FIG. 1;

FIG. 5 is a perspective view diagrammatically shown of a portion of the blade control means for controlling the pitch or attitude of blade 38;

FIG. 6 is a partial section view along the lines 6—6 of FIG. 1;

FIG. 7 is a diagrammatic view of the rudder control means for rudder 65; and

FIG. 8 is a perspective view diagrammatically shown of a portion of the vertical deflector control system shown in FIG. 2.

Referring now to the drawings, aircraft 10, which is of circular configuration has its major elements concentrically disposed about its central vertical structural support or shaft 12. These elements are: a central passenger cabin, cockpit or fuselage 14, fan assembly 16 and annular fuselage 18. An auxiliary compartment 20 is also provided and it and passenger cabin 14 are rigidly attached to support 12.

Fuel tank 22 is annular in shape and is radially and vertically supported by a support shaft 12 through bearing assemblies 24 and 26. Vertical forces arising from tank 22 are additionally supported by an air layer of compressed air in an upper air bearing chamber 28 between top bearing surface of tank 22 and bottom bearing surface of cabin 14, and by a lower air bearing chamber 30 between a bottom bearing surface of tank 22 and top bearing surface of compartment 20. Tank 22, in addition to serving to hold fuel and to provide vertical support, also provides an inner mounting and radial support for each blade assembly 32 of fan assembly 16. This is accomplished by connecting an inner end 34 of tubular member 36 to the periphery of tank 22. Each tubular member 36 rotatably supports a fan or lift blade 38, which according to its rotary position about tubular member 36, provides a varying degree of lift with a given speed of rotation of fan assembly 16. A reaction motor 40, a ram-jet, is mounted near the outer end of each of four of tubular members 36, near the outer end of a tubular member. If only one motor is used or an otherwise unbalanced arrangement of motors is used, appropriate auxiliary weight balancing means for fan assembly 16 would be provided. The tubular members which support motor 40 also provide means for fuel flow to each motor and provide a passageway through which control communications means connect motors 40 and the cockpit.

The outer tips 44 of tubular members 36 are rigidly secured to ring 45. Ring or ring member 45 consists of an upper ring-shaped permanent magnet 46 and lower ring-shaped permanent magnet 47, of, for example a thin sheet of magnetizable metal or ceramic. The magnets are inset in non-conductive support member 48 which attaches ring 45 to tubular members 36. The outer region of each magnet, for example, would be of North polarity and the inner region of each magnet would be of South polarity. Outer fuselage 18 houses a coordinate magnetic assembly which is of a U-shaped configuration or channel and serves as a wheel or ring guide 49 within which ring 45 rotates. Ring guide or channel 49 of outer fuselage 18 has inset in a non-conductive support portion 50 permanent magnets 51 and 52, respectively, wherein these magnets form a portion of the legs of the channel and the magnets are magnetized in like polarity to those of the adjacent magnets of ring member 45. Thus there is repulsion between adjacent surfaces which tends to stabilize and hold ring member 45 centered in channel 49 of fuselage 18. Channel 49 is supported by bulk heads 53 spaced about the circumference of outer fuselage 18 suitably interconnected by annular structural members and covered in accordance with well known air frame construction practices to produce a generally light weight rigid air frame. The exterior of outer fuselage 18 is streamlined as by bringing the circumference to a thin edge at edge 54. Outer fuselage 18 is supported by means of upper struts 55 and lower struts 56 to shaft member 12 (by means not shown).

Forward propulsion of the craft is provided by turbo jets 58 and 60, mounted on each side of the craft on outer fuselage member 18. Ailerons 62 and 64, of suitable heat resistant material, are mounted on fuselage 18 within the thrust cone of turbo jets 58 and 60 to provide auxiliary vertical control in forward flight. Fuel for turbo jets 58 and 60 is supplied from fuel tanks (not shown) mounted in fuselage 18. Conventional rudder 65, shown schematically, through servo control 66 provides auxiliary directional control at high speeds and is mounted at the rear of fuselage 18. It, together with turbo jets 58 and 60 and ailerons 62 and 64, are controlled through control communications connecting these units with appropriate hand and foot controls (not shown) in cockpit 14 through upper struts 55 or lower struts 56.

Extending downward from and hinged to lower struts 56 are vertical air deflectors 67 adjustable to provide a desired anti-torque moment in the craft. Vertical air deflectors 67, of which there are three, are disposed with one being radially in line with the normal heading of the aircraft and the others disposed radially and 120 degrees apart. Deflectors 67, which are pivoted on struts 56, are controllable through control means 68, diagrammatically illustrated, from cockpit 14 to rotate the craft to achieve any desired heading.

Compressed air for the air bearing systems of the craft is provided by air scoops 70 and 72 located on moving surfaces of ring member 45 and fuel tank 22, with air scoops 70 supplying air to ring guide 49 where it effects a radial thrust air bearing between ring 45 and ring guide 49, with a portion of the compressed air being conducted through a plurality of ducts 74 to the outside of fuselage 18 and discharged in a direction counter to rotation of ring 45 to provide additional anti-torque moment to the non-rotating portions of the craft. Air scoops 72 compress air in plenum 75 and ducts 76 and 77 and discharge air into chambers 28 and 30 to serve as a continuously replenishing vertical thrust air bearings of great size and capacity between fuel tank 22 and cabin 14 and compartment 20. Landing gears are of the conventional triangular type and are not shown.

As stated above one purpose of wheel or ring 45, when rotating, is to impart stability to aircraft 10 by its gyroscopic action. Further it affords temporary power augmentation, and thus lift augmentation, derivative from its stored kinetic energy, thus making it possible to achieve a temporary vertical lifting force greatly in excess of that capable of being produced at a given moment by the total thrust of the lift fan motors 40 alone.

This power-lift augmentation is very desirable, as it permits lift fan propulsion units of minimal thrust to maintain an in-flight state while at the same time providing vertical lifting forces temporarily required for takeoff and for safe operation, and maneuver at minimum altitudes.

Power for vertical lift is provided by the high rotationally constrained thrust of reaction engines 40, with lift produced by adjustable airfoil rotor blades 38, configured in accordance with known aerodynamic principles, and jointly or progressively adjustable as to angle of attack through servo control 78 from cockpit 14. It is understood that airfoil rotor blades 38 could incorporate various well known devices or system, among them flaps, interiorily pressurized air discharged outwardly over the airfoils and the like, for producing various desired lift characteristics.

Vertical maneuver would normally be with aircraft 10 maintaining a horizontal attitude, with change in altitude effected by varying the lift produced by the lift fan assembly, with ailerons 62 and 64 and rudder 65 providing auxiliary vertical and lateral control at high forward speeds.

When lift fan rotor is in rotative movement, electric current for operation of various control systems, and for magnetizing magnets 46, 47, 51 and 52 should they be of the electromagnetic type, would be produced by centrally located generator 79, with current distribution between fixed and rotating elements both for power and control purposes being through conventional means such as slip ring assembly 80 (diagrammatically shown) or distribution may be through commutators, brushes or the like. Electric current for initial start up is provided by batteries (not shown) in lower compartment which are maintained charged by generator 79. In starting ram jet engines 40, generator 79 is changed to an electric motor mode of operation and fan assembly and engines 40 are rotated by it up to an operating speed electrically.

With fuel fed through tubular members 36 to ram jets 40 the engines are started. Fan blades 38 are adjusted by control 78 to force air downward past deflectors 67 which are initially positioned to counter any tendency for rotation of the aircraft as a whole. As the craft rises vertically the horizontal attitude of the craft is set at a desired heading by adjusting the position of the deflectors 67 to cause rotation of the craft until the desired heading of the craft is achieved. Next, jet engines 58 and 60 are started and the craft is accelerated to a desired operating speed as determined by the power setting of jet engines 58 and 60. As speed is increased, rudder 65 has an increasing effect in directional control and may be generally employed for steering. Ailerons 62 and 64 also become operative at normal operating speeds and may be employed to effect vertical control of the aircraft by deflecting the exhaust gases either up or down.

The above description of the invention is intended to be illustrative only. Various changes or modifications of

I claim:
1. A vertical lift aircraft of generally circular configuration and comprising:
   (A) a centrally positioned upper fuselage having a bearing surface on a bottom side;
   (B) a centrally positioned lower fuselage having a bearing surface on a top side;
   (C) an annular outer fuselage disposed generally in a horizontal plane and spaced from said centrally positioned upper and lower fuselage and including bearing means for supporting on its inner side the outer, upward and downward forces from a rotating ring;
   (D) fuselage supporting means comprising a centrally positioned vertical supporting member directly supporting said upper and lower fuselage and including a plurality of struts interconnecting said support means and said outer fuselage and providing support for said outer fuselage;
   (E) a lift fan assembly disposed to rotate in a given direction about said vertical support member and being rotatably mounted to said vertical support member in the region between said upper and lower fuselage and comprising:
      (1) a generally annular fuel tank and having inner bearing means for rotatably attaching to said vertical supporting member and upper and lower bearing means for rotation with respect to said bearing surfaces of said upper and lower fuselage and a plurality of spaced outer mounting means for supporting a plurality of lift blade assemblies on the periphery of said tank,
      (2) a plurality of lift blade assemblies, each lift blade assembly comprising a blade and a supporting tubular member, a said blade being rotatably mounted on a said tubular member, and an inner end of each said tubular member being mounted to a said outer mounting means of said fuel tank assembly,
      (3) control means coupled to each said blade for selectively orienting each said blade about a said tubular member,
      (4) at least one reaction motor, a said reaction motor being attached near an outer end of and to a said tubular member and said reaction motor being positioned to provide a generally horizontal rotating force to said lift fan assembly, and
      (5) a supporting and stabilizing ring assembly comprising said ring, an inner edge of which comprises means for supporting a said outer end of each tubular member and including upper, lower, and outer ring bearing means for supporting said ring bearing means on said bearing means of said outer fuselage;
   (F) lateral propulsion means mounted on a said fuselage for providing propulsion of said air craft in a horizontal plane; and
   (G) attitude control means including means attached to said vehicle for varying air flow with respect to said vehicle.

2. The aircraft set forth in claim 1 wherein said means for varying air flow of said attitude control means comprises airfoils rotatably mounted about each of a plurality of said struts.

3. The vertical lift aircraft set forth in claim 2 wherein said bearing means of said annular outer fuselage comprises first means for providing magnetic fields and said upper and lower bearing means of said ring assembly comprises second means for providing magnetic fields and said first and second last named means are relatively positioned and oriented to magnetically oppose a change in vertical positioning of said ring assembly with respect to said outer fuselage.

4. A vertical lift aircraft as set forth in claim 3 wherein said bearing means of said annular outer fuselage includes an air bearing surface and wherein said outer bearing means of said supporting and stabilizing ring assembly comprises means attached to the inside edge of said ring for entraining and compressing air and including means for directing compressed air between said ring and said bearing surface.

5. The vertical lift aircraft set forth in claim 4 wherein:
   (A) said bearing means of said annular outer fuselage comprises a channel in which a portion of said supporting and stabilizing ring rotates and wherein:
      (1) an upper portion of said channel comprises a magnetic member having an inner pole of a first polarity and an outer pole of a second and opposite polarity, and
      (2) the lower portion of said channel comprises a magnetic member having an inner pole of a first polarity and an outer pole of an opposite and second polarity;
   (B) said upper bearing means of said supporting and stabilizing ring assembly comprises a magnetic member positioned with like poles adjacent to like poles of said magnetic member of said upper portion of said channel; and
   (C) said lower bearing means of said supporting and stabilizing ring comprising a magnetic member positioned with like poles of said poles adjacent to like poles of said magnetic member of said lower portion of said channel.

6. The vertical lift aircraft set forth in claim 5 wherein the bearing surfaces between said upper fuselage and said fuel tank and between said lower fuselage and said fuel tank are separated and supported apart by compressed air and said fuel tank includes means mounted on its periphery for entraining air under pressure between said surfaces to produce said compressed air.

7. A vertical lift aircraft as set forth in claim 6 further comprising a plurality of passageways interconnecting the region between said outer bearing means of said supporting and stabilizing ring assembly and said bearing surface of said outer fuselage through said outer fuselage to a point on the outer surface of said fuselage and wherein the orientation of the outlet is along a line of direction having a directional component opposite to said given direction of rotation of said lift fan assembly.

8. The vertical lift aircraft set forth in claim 2 wherein said reaction motor is a ram jet engine.

9. The vertical lift aircraft set forth in claim 2 wherein said reaction motor is a turbo jet engine.

References Cited

UNITED STATES PATENTS

| | | | |
|---|---|---|---|
| 2,807,428 | 9/1957 | Wibault | 244—23 |
| 2,980,365 | 4/1961 | Yohe | 244—23 |
| 3,123,320 | 3/1964 | Slaughter | 244—12 |
| 3,182,929 | 5/1965 | Lemberger | 244—12 |

FOREIGN PATENTS 230,204 11/1963 Austria.

MILTON BUCHLER, *Primary Examiner.*

JAMES E. PITTENGER, *Assistant Examiner.*

U.S. Cl. X.R.

244—135